United States Patent

Burleigh et al.

Patent Number: 5,259,426
Date of Patent: Nov. 9, 1993

[54] OIL DRAIN FUNNEL

[76] Inventors: James F. Burleigh; Roger S. Burleigh, both of 841 Sherwood Rd., Shreveport, La. 71106

[21] Appl. No.: 12,332

[22] Filed: Feb. 1, 1993

[51] Int. Cl.$^5$ .............................................. B67C 11/00
[52] U.S. Cl. ...................... 141/98; 141/331; 141/392; 7/100; 81/121.1; 184/1.5
[58] Field of Search ...................... 141/331–342, 141/98, 392; 7/100; 184/1.5, 106; 81/438, 121.1, 124.4, 185

[56] References Cited

U.S. PATENT DOCUMENTS

| | | | |
|---|---|---|---|
| 1,554,589 | 9/1925 | Long | 184/1.5 |
| 1,631,129 | 6/1927 | Hiscox et al. | 184/1.5 |
| 1,951,498 | 3/1934 | Whitney | 184/1.5 |
| 3,239,233 | 3/1966 | Stillwagon, Jr. | 81/438 |
| 3,410,438 | 11/1968 | Bartz . | |
| 4,022,257 | 5/1977 | O'Connell | 141/98 |
| 4,195,710 | 4/1980 | Garrison | 184/1.5 |
| 4,620,460 | 11/1986 | Gonzales, Jr. | 81/124.4 |
| 4,714,138 | 12/1987 | Zaccone | 184/1.5 |
| 4,800,933 | 1/1989 | Moore et al. | 141/98 |

FOREIGN PATENT DOCUMENTS

| | | | |
|---|---|---|---|
| 632644 | 3/1977 | U.S.S.R. | 141/331 |
| 0197711 | 11/1977 | U.S.S.R. | 184/1.5 |
| 1027138 | 7/1983 | U.S.S.R. | 141/331 |
| 1127787 | 12/1984 | U.S.S.R. | 184/1.5 |
| 1306909 | 4/1987 | U.S.S.R. | 141/331 |
| 1331700 | 8/1987 | U.S.S.R. | 141/331 |
| 1622203 | 1/1991 | U.S.S.R. | 141/331 |

Primary Examiner—Ernest G. Cusick
Attorney, Agent, or Firm—John M. Harrison

[57] ABSTRACT

A drain funnel for directing oil or transmission fluid from the oil pan or transmission of a vehicle to a collecting pan or receptacle. The drain funnel is characterized by a tapered body portion having a top rim which mounts multiple socket supports that support a socket in the center of a circle defined by the top rim. The socket is fitted with a plug receptacle or with threads for receiving a companion threaded plug receptacle for engaging an oil pan, crankcase or transmission drain plug on the vehicle and seating the drain plug in the plug receptacle or in a recessed cage in the plug receptacle to prevent the drain plug from falling through the funnel. In a preferred embodiment a funnel nipple is provided at the bottom end of the tapered funnel body and is threaded to receive a drain hose for draining the oil or transmission fluid into the collecting pan or receptacle.

7 Claims, 1 Drawing Sheet

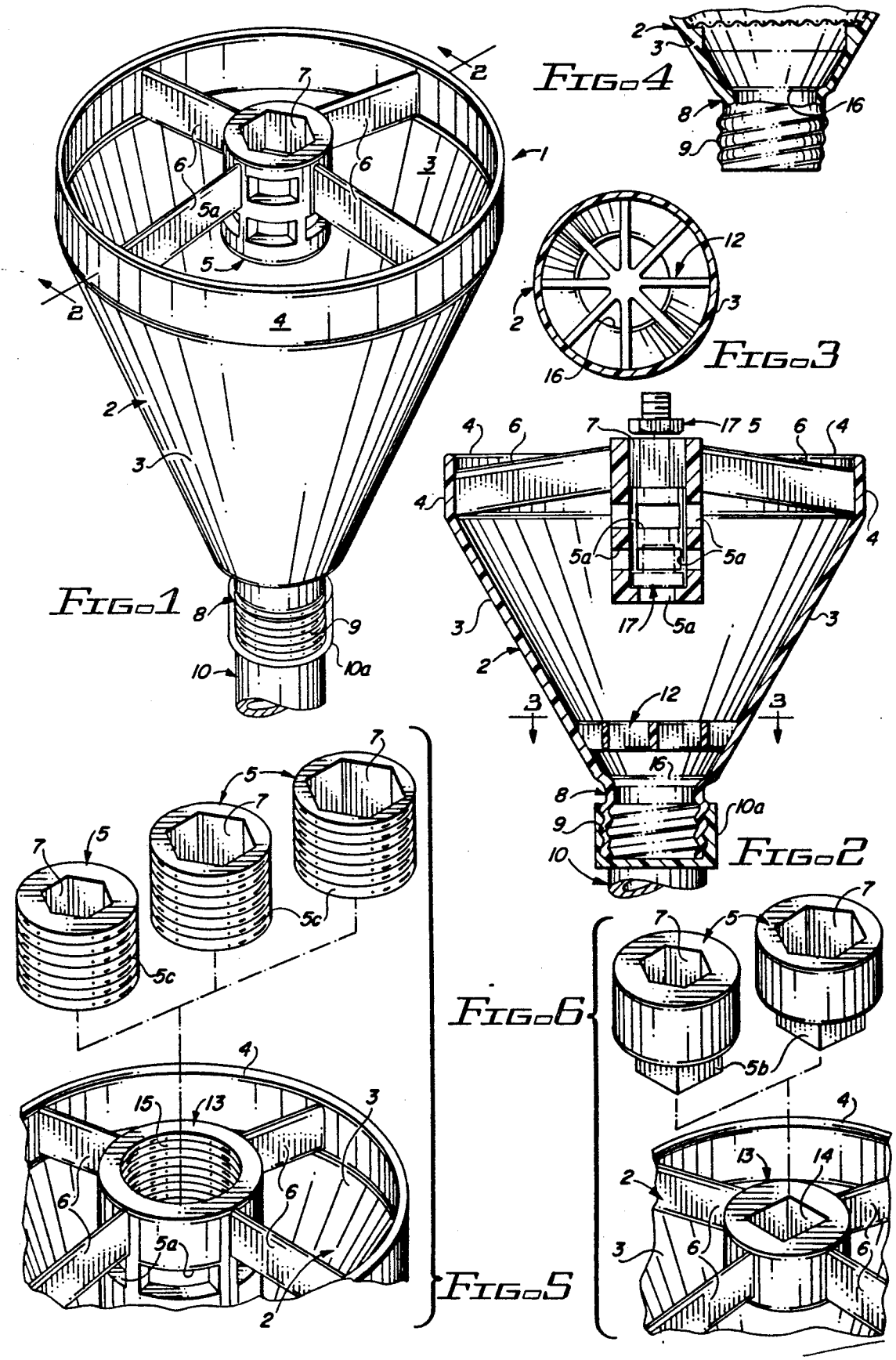

OIL DRAIN FUNNEL

BACKGROUND OF THE INVENTION

1. Field of the Invention

This invention relates to oil and transmission fluid disposal devices and more particularly, to an oil and transmission fluid drain funnel which is characterized by a centrally located socket fitted with a plug receptacle or with threads for receiving threaded plug receptacles of various size, to receive a drain plug normally threaded into the oil pan, crankcase or transmission housing of a vehicle. Accordingly, the drain funnel operates to retain the drain plug and prevent the drain plug from falling through the funnel into a drain pan or collection receptacle. In a preferred embodiment of the invention the drain funnel is characterized by a tapered funnel body fitted with a top rim, to which is mounted multiple, radially disposed socket supports that position a socket approximately in the center of the circle defined by the top rim. A threaded funnel nipple is provided at the base of the funnel to receive a drain hose for draining oil or transmission fluid through the funnel and into the collection receptacle or drain pan.

One of the problems associated with oil and transmission fluid disposal and draining oil and transmission fluid from oil pans, crankcases and transmission housings of vehicles, is that of retaining the oil pan or transmission housing drain plug or bolt and preventing the drain plug or bolt from falling through the funnel into the disposal pan or receptacle. Many funnels are fitted with screens or grids which prevent the drain plug or bolt from falling through the funnel, but this expedient simply necessitates retrieval of the drain plug from the screen and the interior of the funnel after the oil has passed through the funnel, an operation which is messy, at best. These conventional funnels are usually characterized by a one-piece plastic or metal device, the top or rim of which is positioned beneath the oil drain opening while the drain plug is removed from the oil pan, crankcase or transmission housing and the flow of oil or transmission fluid is allowed to spill into the funnel after the drain plug or bolt falls into the funnel and is retained on the grid.

2. Description of the Prior Art

Various types of mechanisms and devices for draining oil pans, crankcases and transmission housings of vehicles are known in the art. A "Portable Oil Drain Pan" is detailed in U.S. Pat. No. 1,554,589, dated Sep. 22, 1925, to L. D. Long. The patent details a portable oil drain pan which includes an oil receptacle having a depending oil receiving area with a screen at the bottom and a baffle beneath the screen to prevent splashing of the oil and retain the oil drain plug when the crankcase or oil pan of a vehicle is drained. U.S. Pat. No. 1,631,129, dated Jun. 7, 1927, to E. E. Hiscox, et al, details an "Automobile Oil Drain Device". The device is pivotally mounted on a bracket and includes a length of pipe having a ratchet adjusting device and an oil collection funnel at the top, with a screen located in the oil collection funnel to receive the oil drain plug or bolt when oil is drained from the crankcase or oil pan of a vehicle. U.S. Pat. No. 1,951,498, dated Mar. 20, 1934, to H. E. Whitney, details a "Receptacle", which includes a length of telescoping pipe, one end of which terminates in an oil can and the opposite end receiving a funnel having a screen inside for retaining the oil drain plug or bolt when oil is drained into the funnel. A "Drip Receptacle" is detailed in U.S. Pat. No. 3,410,438, dated Nov. 12, 1968, to R. O. Bartz. The receptacle includes a portable tank having a recessed sink portion in one end, with a perforated drain plate at the bottom thereof for retaining the oil drain plug or bolt when oil is drained into the sink portion from the crankcase or oil pan of a vehicle. A "Funnel-Drainer Device" is detailed in U.S. Pat. No. 4,022,257, dated May 10, 1977, to Daniel J. O'Connell. The device includes a continuous sidewall defining a container having a vertical axis. The container has an inlet adaptor to receive the drained liquid, which inlet is disposed along the vertical axis and an outlet extending through the sidewall of the container. A removable receptacle such as a plastic bag, is selectively coupled to the container adjacent the outlet, such that the waste liquid flows through the inlet into the container and exits through the outlet into the receptacle. U.S. Pat. No. 4,195,710, dated Apr. 1, 1980, to Ward S. Garrison, details an "Oil Drain System". The oil drain system has a rectangular collection receptacle fitted with a fill spout adjacent one end thereof. A funnel member is pivotally mounted on the receptacle and includes a frame with a removable flexible sheet secured thereto to extend at an incline upwardly and outwardly from the fill spout into the receptacle, with the adjacent end of the sheet extending into the fill spout and gripped therein by a movable retainer. The receptacle is shallow, so that the funnel member and receptacle may be positioned under the vehicle motor to receive oil drained from the motor.

It is an object of this invention to provide an oil or transmission fluid drain funnel fitted with a drain plug receptacle or socket which retains the drain plug and prevents the drain plug from falling into or through the funnel when oil or transmission fluid is drained from the crankcase, oil pan or transmission housing of a vehicle.

Another object of this invention is to provide a new and improved oil and transmission fluid drain funnel for draining oil and transmission fluid from a vehicle, which funnel is equipped with a centrally located socket sized to receive the oil or transmission fluid drain plug of a vehicle and retain the drain plug while oil or transmission fluid is draining from the vehicle crankcase, oil pan or transmission housing.

Yet another object of this invention is to provide a new and improved oil and transmission fluid drain funnel which includes a fixed socket receptacle for receiving removable sockets sized to fit and receive the oil and transmission drain plugs when oil or transmission fluid is drained from the oil pan, crankcase, or transmission housing of a vehicle.

Still another object of this invention is to provide a new and improved drain funnel for draining oil and transmission fluid from vehicles and retaining the drain plug in a socket receptacle positioned in the mouth of the funnel and elevated above the plane of the funnel rim.

SUMMARY OF THE INVENTION

These and other objects of the invention are provided in a new and improved vehicle fluid drain funnel which is characterized by a tapered funnel body, a funnel nipple provided on the bottom of the body and a drain hose connected to the funnel nipple and a socket or socket receptacle mounted on the rim of the funnel at least partially above the plane of the funnel rim by means of socket supports, for engaging and receiving the drain plug or bolt or receiving sockets sized to fit the drain plug or bolt and retaining the drain plug or bolt during draining of fluid from the oil pan, crankcase, or transmission housing of the vehicle.

BRIEF DESCRIPTION OF THE DRAWING

The invention will be better understood by reference to the accompanying drawing, wherein:

FIG. 1 is a perspective view of first preferred embodiment of the oil drain funnel of this invention;

FIG. 2 is a sectional view taken along line 2—2 of the oil drain funnel illustrated in FIG. 1;

FIG. 3 is a sectional view taken along line 3—3 of the oil drain funnel illustrated in FIG. 2;

FIG. 4 is a side sectional view taken of the bottom portion of the oil drain funnel;

FIG. 5 is a perspective view, partially in section, of second preferred embodiment of the oil drain funnel; and FIG. 6 is a perspective view, partially in section, of yet another preferred embodiment of the oil drain funnel.

DESCRIPTION OF THE PREFERRED EMBODIMENTS

Referring initially to FIGS. 1 and 2 of the drawing, in a preferred embodiment the drain funnel of this invention is generally illustrated by reference numeral 1. The drain funnel 1 is characterized by a funnel body 2 having a tapered wall 3, extending from a top rim 4 of selected diameter to a funnel nipple 8, having an internal drain opening 16. In a most preferred embodiment of the invention the funnel nipple 8 includes nipple threads 9, which are designed to threadably receive the internally-threaded hose cap 10a of a drain hose 10. The opposite end of the drain hose 10 is designed to be positioned over a fluid disposal pan or collection receptacle (not illustrated) for disposing of oil from the crankcase and oil pan (not illustrated) or transmission fluid from the transmission housing (not illustrated) of a vehicle (not illustrated). Multiple socket supports 6 project radially inwardly from fixed attachment to the top rim 4 and support a socket 5, provided with a typically hexagonal plug receptacle 7 which is sized and shaped to receive the normally hexagonal head of a conventional drain plug or bolt 17, conventionally threaded in the oil pan of a vehicle, as hereinafter further described. As further illustrated in FIG. 2, multiple socket openings 5a are provided in the bottom of the socket 5 to define a basket and facilitate drainage of oil or transmission fluid from the nut receptacle 7 of the socket 5 after the drain plug or bolt 17 drops and recesses into the socket 5. Furthermore, a safety grid 12 is provided in the base of the funnel body 2 to receive the drain plug or bolt 17 under circumstances where the drain plug or bolt 17 does not seat in the nut receptacle 7 and inadvertently falls into the funnel body 2 of the oil drain funnel 1. Accordingly, the safety grid 12 serves to prevent the drain plug or bolt 17 from falling through the funnel body 2 and the drain hose 10, into a collection receptacle (not illustrated).

Referring to FIG. 4 of the drawing, in an alternative preferred embodiment of the invention the drain funnel 1 illustrated in FIG. 1 may be fitted with a safety screen 11 in lieu of the safety grid 12. It will be appreciated that the safety screen 11 performs the same function as the safety grid 12, that is, to prevent the drain plug or bolt 17 from falling through the funnel body 2 and drain hose 10, into a collection receptacle.

Referring now to FIG. 5 of the drawing, in another preferred embodiment of the invention the socket 5 illustrated in FIGS. 1 and 2 is replaced by a fixed socket receptacle 13, which is fitted with internal receptacle threads 15 that selectively receive corresponding socket threads 5c of multiple removable sockets 5. Each of the removable sockets 5 is characterized by a nut receptacle 7 of different size, in order to receive the drain plug or bolt 17 of corresponding size in the various vehicles. Accordingly, it will be appreciated by those skilled in the art that the various removable threaded sockets 5 may be selected and threaded into the internally-threaded socket receptacle 13, depending upon the particular make and model of vehicle being serviced. This embodiment of the invention lends versatility to the drain funnel 1 and prevents the necessity of providing separate drain funnels 1 for vehicles having oil or transmission drain plugs or bolts 17 of varying size.

Referring to FIG. 6 of the drawing, in yet another preferred embodiment of the invention the socket 5 illustrated in FIGS. 1 and 2 is replaced by a socket receptacle 13, provided with a receptacle seat 14 which is shaped to selectively receive the socket base 5b of a pair of sockets 5, each of which are provided with a nut receptacle 7 of varying size. The function of the sockets 5 illustrated in FIG. 6 is identical to that of the sockets 5 illustrated in FIG. 5, in that the nut receptacles 7 of varying size are designed to fit and receive drain plugs or bolts 17 of varying size which may be provided on various types of vehicles.

Referring again to FIGS. 1 and 2 of the drawing, in a most preferred embodiment of the invention the top edge of the socket 5, as well as the socket receptacle 13 illustrated in FIGS. 5 and 6, are elevated slightly above the plane of the top edge of the top rim 4 by elevating the center ends of the parallelogram-shaped socket supports 6. This expedient facilitates initially conventionally loosening the drain plug or bolts 17 from the oil pan, crankcase or transmission housing of a vehicle by means of a wrench and subsequently engaging the nut receptacle 7 with the drain plug or bolt 17 to seat the head of the drain plug or bolt 17 in the nut receptacle 7. The drain plug or bolt 17 can then be further loosened by rotating the drain funnel 1 in the counterclockwise direction as viewed from the bottom of the drain funnel 1. When the drain plug or bolt is removed from the oil pan, crankcase or transmission housing, fluid begins to flow through the funnel body 2 between the socket supports 6 and through the socket openings 5a in the socket 5, while the drain plug or bolt 17 is retained in the socket 5 and may be easily retrieved after the fluid draining operation. Under circumstances where the drain funnel 1 is equipped with a socket receptacle 13 fitted with either the receptacle threads 15 as illustrated in FIG. 5, or the receptacle seat 14 illustrated in FIG. 6, multiple sockets 5 of the design illustrated in FIG. 5 or FIG. 6 may be made available and the respective sockets 5 and socket receptacles 13 may be open as illustrated in FIG. 2 to recess the drain plug or bolt 17. Alternatively, the sockets 5 and socket receptacles 13 may terminate at the respective plug receptacle 7, as desired, with no recessing of the drain plug or bolt 17, as illustrated in FIG. 6. The socket 5 having a nut receptacle 7 of proper size and polygonal shape is threaded into the receptacle threads 15 of the socket receptacle 13 as illustrated in FIG. 5, or seated in the receptacle seat 14 of the socket receptacle 13 illustrated in FIG. 6, to accommodate the drain plug or bolt 17, as described above.

It will be further appreciated by those skilled in the art that the drain funnel of this invention may be constructed of substantially any desired material, including plastic, metal, fiberglass and the like, as desired, the choice of material being dictated by economics of manufacture and resistance to corrosion or deterioration by contact with oil and transmission fluid. For example, the drain funnel 1 may be injection-molded from a suitable plastic material according to the knowledge of those skilled in the art and the drain hose 10 may be constructed of plastic or rubber and designed to threadably or otherwise seat on the nipple threads 9 of the funnel nipple 8, as desired. Alternatively, the drain hose 10 may be removed and oil or transmission fluid drained directly through the funnel body 2 from the oil pan or transmission housing of the vehicle into a disposal receptacle or pan (not illustrated), in conventional fashion. Moreover, as further illustrated in FIGS. 2, 3 and 4, either a safety grid 12 or a safety screen 11 may be utilized in the funnel body 2 of the oil drain funnel 1 to retain the oil drain plug or bolt 17 in the funnel in the event of inadvertent displacement of the drain plug or bolt 17 from the plug receptacle 7 of the various sockets 5.

It will be further appreciated by those skilled in the art that the drain funnel 1 can be constructed of any desired size, depending upon the fluid capacity of the vehicle being serviced and since the drain funnel 1 is light in weight and portable, it may be easily used to drain oil and transmission fluid, as well as other fluids, from vehicles. The vehicles may be quickly and easily serviced by retaining the drain plugs in the sized plug receptacles 7 of the various sockets 5.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A drain funnel for draining fluid from a vehicle having a drain plug, comprising a funnel having a funnel mouth or receiving a flow of fluid from the vehicle and a socket receptacle carried by said funnel at said funnel mouth, a seat provided in said socket receptacle, receptacle threads provided in said seat and a socket having a socket base and base threads shaped for removable, threadable insertion in said seat, said socket having a plug receptacle of selected size for receiving and removably retaining the drain plug.

2. The drain funnel of claim 1 comprising a drain tube threadably attached to said funnel for draining said funnel.

3. A drain funnel for draining fluid from a vehicle having a drain plug, comprising a funnel having a funnel mouth for receiving a flow of fluid from the vehicle, a plurality of socket supports projecting radially, inwardly and upwardly from said funnel, a socket receptacle fixedly carried by said socket supports, a seat provided in said socket receptacle, receptacle threads provided in said seat and a socket having a socket base shaped for removable insertion in said seat and base threads provided on said socket base, with at least a portion of said socket receptacle elevated above the plane of said funnel mouth.

4. The drain funnel of claim 3 comprising at least one drain opening provided in said socket receptacle for draining fluid from said socket.

5. The drain funnel of claim 3 comprising a plug provided in said funnel for retaining the drain plug in said funnel if the drain plug should exit said socket receptacle.

6. The drain funnel of claim 3 comprising a drain tube threadably attached to said funnel for draining said funnel.

7. The drain funnel of claim 3 comprising:
   (a) at least one drain opening provided in said socket receptacle for draining fluid from said socket receptacle and said socket;
   (b) a plug retainer provided in said funnel for retaining the drain plug in said funnel if the drain plug should exit said socket receptacle; and
   (c) a drain tube threadably attached to said funnel for draining said funnel.

* * * * *